(12) United States Patent
Suzuki

(10) Patent No.: US 7,072,122 B2
(45) Date of Patent: Jul. 4, 2006

(54) LENS APPARATUS, PROJECTION TYPE OPTICAL APPARATUS AND PROJECTION TYPE IMAGE DISPLAY APPARATUS

(75) Inventor: Shoji Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/233,768

(22) Filed: Sep. 23, 2005

(65) Prior Publication Data

US 2006/0018038 A1    Jan. 26, 2006

Related U.S. Application Data

(63) Continuation of application No. 10/200,920, filed on Jul. 22, 2002, now Pat. No. 7,019,916.

(30) Foreign Application Priority Data

Jul. 24, 2001    (JP)    ............................. 2001-223157

(51) Int. Cl.
*G02B 15/14*    (2006.01)

(52) U.S. Cl. ...................................... 359/699; 359/700

(58) Field of Classification Search ........ 359/699–704, 359/823, 826, 649; 349/5; 396/83, 144, 396/146

See application file for complete search history.

(56) References Cited

U.S. PATENT DOCUMENTS

| | | | |
|---|---|---|---|
| 4,341,459 A | 7/1982 | Sugiura et al. | ............. 399/216 |
| 4,961,635 A | 10/1990 | Kondo et al. | ............... 396/701 |
| 5,634,147 A | 5/1997 | Machida | ....................... 396/84 |
| 5,654,833 A | 8/1997 | Fujike et al. | ............... 359/822 |
| 5,715,482 A | 2/1998 | Wakabayashi et al. | ........ 396/79 |
| 5,748,390 A | 5/1998 | Koiwai et al. | ............... 359/811 |
| 5,832,317 A | 11/1998 | Shimizu | ....................... 396/83 |
| 5,884,106 A | 3/1999 | Manabe | ....................... 396/84 |
| 6,147,814 A | 11/2000 | Kitazawa et al. | ........... 359/699 |
| 6,185,375 B1 | 2/2001 | Mikami | ....................... 396/84 |
| 6,400,904 B1 | 6/2002 | Kobayashi et al. | ......... 396/144 |
| 6,553,185 B1 | 4/2003 | Inaba et al. | ................... 396/85 |
| 6,639,730 B1 | 10/2003 | Muto et al. | ................. 359/694 |
| 2001/0005288 A1 | 6/2001 | Hayashi et al. | ............. 359/826 |

FOREIGN PATENT DOCUMENTS

| | | |
|---|---|---|
| JP | LO H10-161193 | 6/1980 |
| JP | 3-139623 | 6/1991 |
| JP | LO H07-311326 | 11/1995 |
| JP | LO H08-234282 | 9/1996 |
| JP | LO H11-212144 | 8/1999 |
| JP | LO 2001-59932 | 3/2001 |

OTHER PUBLICATIONS

English Abstract of JPLO H08-234282.
English Abstract of JPLO H07-311326.
English Abstract of JPLO H10-161193.
English Abstract of JPLO H11-212144.
English Abstract of JPLO 2001-59932.

*Primary Examiner*—Huy Mai
(74) *Attorney, Agent, or Firm*—Morgan & Finnegan, LLP

(57) ABSTRACT

An optical apparatus according to the present invention has a plurality of lens units which can move in the direction of an optical axis, each of the lens units has a cam follower, a guide member which guides the each lens unit in the direction of the optical axis, and a cam member which has cams engaging with the cam followers and drives the lens units in the direction of the optical axis by rotating. The cam followers of the lens units are disposed substantially straight in the direction of the optical axis.

18 Claims, 6 Drawing Sheets

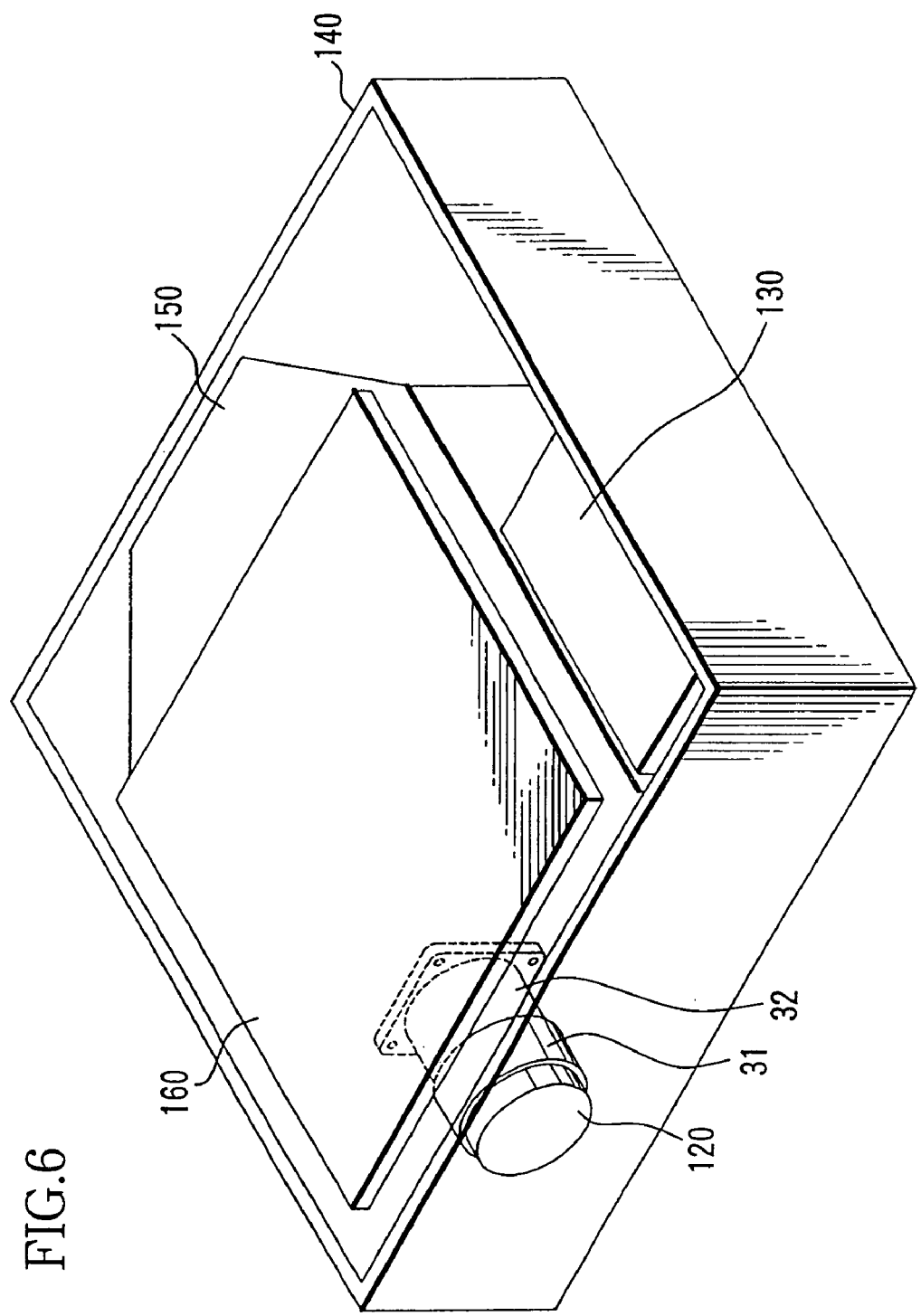

LENS APPARATUS, PROJECTION TYPE OPTICAL APPARATUS AND PROJECTION TYPE IMAGE DISPLAY APPARATUS

This is a continuation of application Ser. No. 10/200,920, filed Jul. 22, 2002 now U.S. Pat. No. 7,019,916.

BACKGROUND OF THE INVENTION

1. Field of the Invention

The present invention relates to an optical apparatus used for a projection type image display apparatus or an image-taking apparatus.

2. Description of the Related Art

A projection lens barrel used for a projection type image display apparatus is constituted so that zooming etc. may be performed by driving each moving lens unit in the direction of an optical axis by arranging a cam ring so as to surround the circumference of a lens barrel body, engaging a cam follower, which is provided in each moving lens unit, with a cam groove section formed in the cam ring, and rotating the cam ring.

FIG. 6 shows an example of a projection type image display apparatus in which such a projection lens barrel is mounted.

Inside an apparatus housing 140, an optical box 150 where an illumination optical system, a color separation system, an image display device, a color synthesis system, etc. are incorporated, a projection lens barrel 120 which is mounted in a light emitting section of this optical box 150, a power supply unit 130, and an electric circuit board 160 which controls an image forming device, forming an original image, an illumination lamp, etc. are contained.

In addition, the structure of the projection lens barrel 120 is shown in FIG. 5. Reference numeral 33 denotes a front fixed barrel and reference numeral 39 denotes a rear fixed barrel. These front and rear fixed barrel 33 and 39 constitute a lens barrel body integrated into a piece. A guide groove (not shown) for guiding a moving lens units, described later, in the direction of the optical axis is formed in the inner circumference of the front fixed barrel 33.

Reference numeral 31 denotes a zoom operation member provided in the outer circumference of the front fixed barrel 33. Reference numeral 32 denotes a cam ring rotatably arranged around the optical axis in the outer circumference of the front fixed barrel 33, and is combined with the zoom operation member 31 with screws (not shown).

Inside the lens barrel body, a plurality of moving lens holding barrels 35, 36, 37, and 38 which supports second to fifth lenses II to V for performing zooming and can move in the direction of the optical axis is contained. In three locations in the circumferential direction of these respective moving lens holding barrels 35 to 38, cam followers 40a (40b, 40c), 41a (41b, 41c), 42a (42b, 42c), and 43a (43b, 43c) are mounted, and each cam follower engages with each of cam groove sections 32a to 32d for each moving lens unit which is formed in the cam ring 32.

Reference numeral 34 denotes a first lens holding barrel holding a first lens I for focusing by moving in the direction of the optical axis, and a male helicoid section 34a is formed in its outer circumference. The first lens holding barrel 34 engages with a focus operation member 30 so as to rotate integrally with the focus operation member 30. Since engaging with a female helicoid section 33a formed in the front inner circumference in the front fixed barrel 33, the male helicoid section 34a can move this first lens holding barrel 34 in the direction of the optical axis by rotating the first lens holding barrel 34 by rotational operation of the focus operation member 30, and can perform the focusing.

However, since the cam ring 32 is arranged so as to surround the outer circumference of the lens barrel body in the lens barrel having the above-described structure, the outer diameter of the lens barrel becomes large in the whole circumferential direction.

In addition, since it is necessary to mount the cam followers, engaged with the cam groove sections 32a to 32d of the cam ring 32, in three locations in the circumferential direction of respective moving lens holding barrels 35 to 38, assembly operation is complicated, and in addition, it also needs much labor to perform adjustment for removing each minute tilt of the lenses II to V, which derives from dispersion in dimensional accuracy as parts every three cam followers, to the optical axis.

Furthermore, in the above-described lens barrel, the cam ring 32 is formed as a metal part from a viewpoint of securing the positional accuracy of the moving lens holding barrels 35 to 38.

However, this cam ring 32 which is a metal part receives noise generated in the power supply unit 130 shown in FIG. 6 to become a factor of generating noise in the electric circuit board 160 near the cam ring 32. This may become a cause of a trouble at the time of driving the apparatus by noise arising in the electric circuit board 160.

SUMMARY OF THE INVENTION

The present invention provides an optical apparatus (and projection type optical apparatus), which can lessen the outer diameter of the optical apparatus, whose assembly operation is easy, and which hardly has tilts of lenses to an optical axis, and a projection type image display apparatus which use the projection type optical apparatus.

The optical apparatus according to the present invention comprises: a plurality of lens units which can move in the direction of an optical axis, each of the lens units has a cam follower, a guide member which guides the each lens unit in the direction of the optical axis, and a cam member which has cams engaging with the cam followers and drives the lens units in the direction of the optical axis by rotating. The cam followers of the lens units are disposed substantially straight in the direction of the optical axis.

Therefore, since points of action, which are engaging points of the cam member and the cam followers of the lens units, and guiding points, which are engaging points of the lens units and the guide member, can be close, it is easy to obtain the good positional accuracy of the lens units.

The optical apparatus according to the present invention comprises, at least three lens units which can move in the direction of an optical axis, each of the lens units has a cam follower and a sleeve, two guide shafts which guide the lens units in the direction of the optical axis, and a cam member which has cams engaging with the cam followers and drives the lens units in the direction of the optical axis by rotating. The cam member is a cylindrical cam and rotates about an axis substantially parallel to the optical axis. The sleeves engage with the two guide shafts alternately in the direction of the optical axis. The cam followers are arranged between the two guide shafts and disposed substantially straight in the direction of the optical axis.

In this manner, by arranging the cam member, which is a cylindrical cam, on a part of outer circumference of an apparatus, it becomes possible to lessen the outer diameter of a portion, other than a portion in which the cam member is arranged, in the optical apparatus in comparison with a case of arranging a cam ring over whole apparatus circumference like a conventional way.

Further specifically, it is good to arrange each of the guide shafts within a range of 45° with respect to the cam member (cylindrical cam) about the optical axis. And more preferably, it is good to arrange each of the guide shafts within a range of 30° with respect to the cam member (cylindrical cam) about the optical axis.

In addition, by properly (alternately) assigning each guide shaft, with which each sleeve of the lens units engages, between two guide shafts, it becomes possible to take the long engagement length of each sleeve to the guide shaft, and hence, it is possible to realize the optical apparatus where tilts of lens units to the optical axis hardly arise.

Furthermore, in the optical apparatus (lens barrel), only one cam follower engaging with the cam of the cam member may be mounted every one lens unit, and hence, not only it is easy to perform assembly operation, but also it is easy to remove a minute tilt resulting from dispersion in the part accuracy of the cam followers.

In addition, a projection type image display apparatus according to the present invention projects light, modulated by an image forming device which forms an original image, by the above-described optical apparatus on a projection surface. In this projection type image display apparatus, in the case that an electric circuit board is arranged substantially parallel to the optical axis of the optical apparatus, it is good to make a cam member of resin, or to arrange the optical apparatus (lens barrel) so that the cam member and the guide member (or guide shafts) are located in the opposite side of the electric circuit board with sandwiching the optical axis.

Although the cam member may be made of metal, it is possible by making it of resin to prevent the cam member from becoming a noise-generating factor in an electric. circuit board with receiving noise from a power supply unit. In addition, by arranging two guide shafts, which are metal parts, in the opposite side of the electric circuit board with sandwiching the optical axis, it becomes possible to separate metal parts of the optical apparatus from the electric circuit board, and hence, it becomes possible to further securely prevent the metal parts of the optical apparatus from becoming a factor of generating noise in the electric circuit board.

A detailed configuration of the lens apparatus (or projection type optical apparatus), and projection type image display apparatus of the invention will be apparent from the embodiments, described below.

BRIEF DESCRIPTION OF THE DRAWINGS

FIG. 6 is a perspective view of a projection type image display apparatus where the conventional lens barrel is mounted.

DETAILED DESCRIPTION OF THE PREFERRED EMBODIMENTS

Hereinafter, preferred embodiments of the invention will be described in detail with reference to the drawings.

Figure 1:
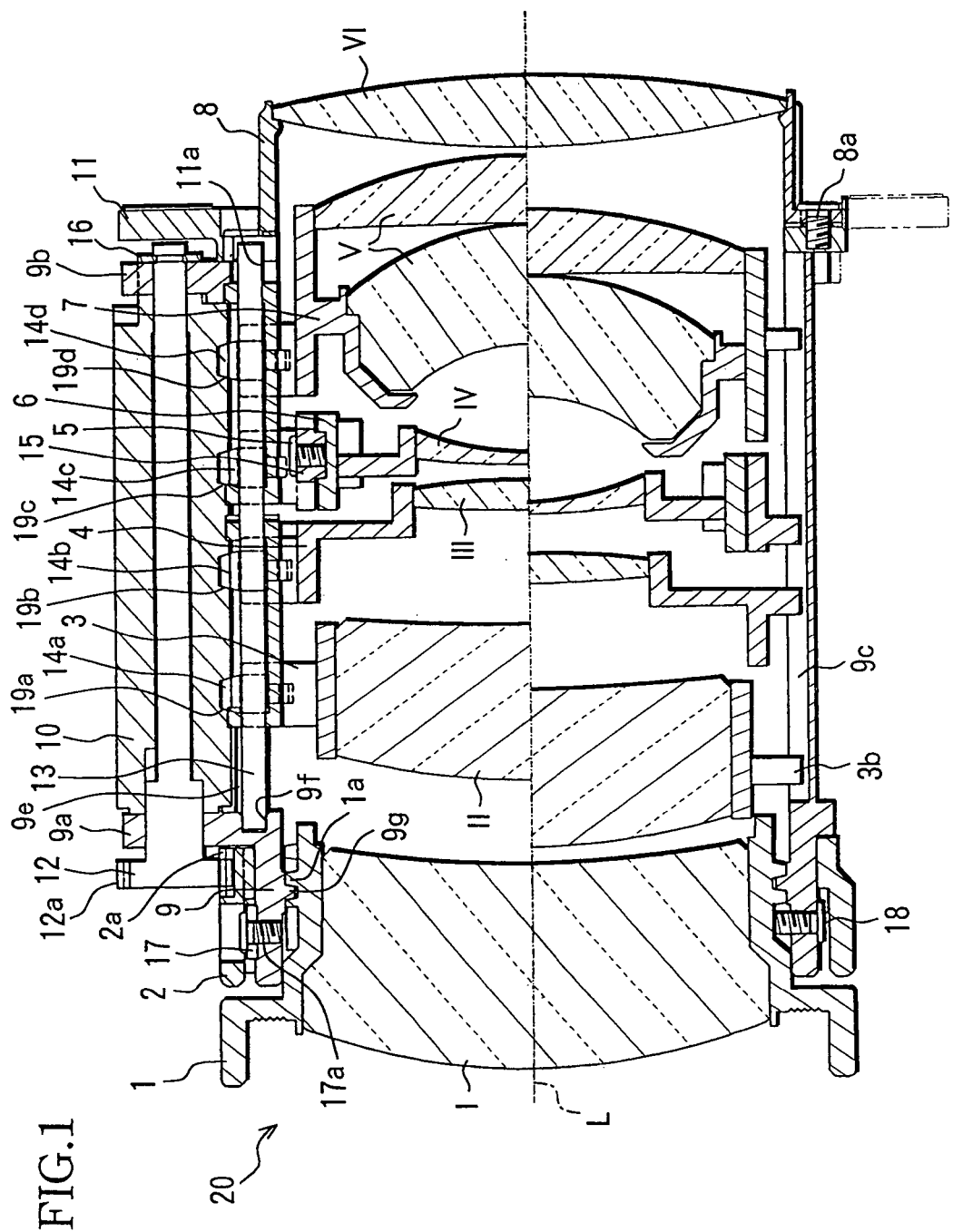
FIG. 1 is a sectional view of a lens barrel which is an embodiment of the present invention.
Figure 2:
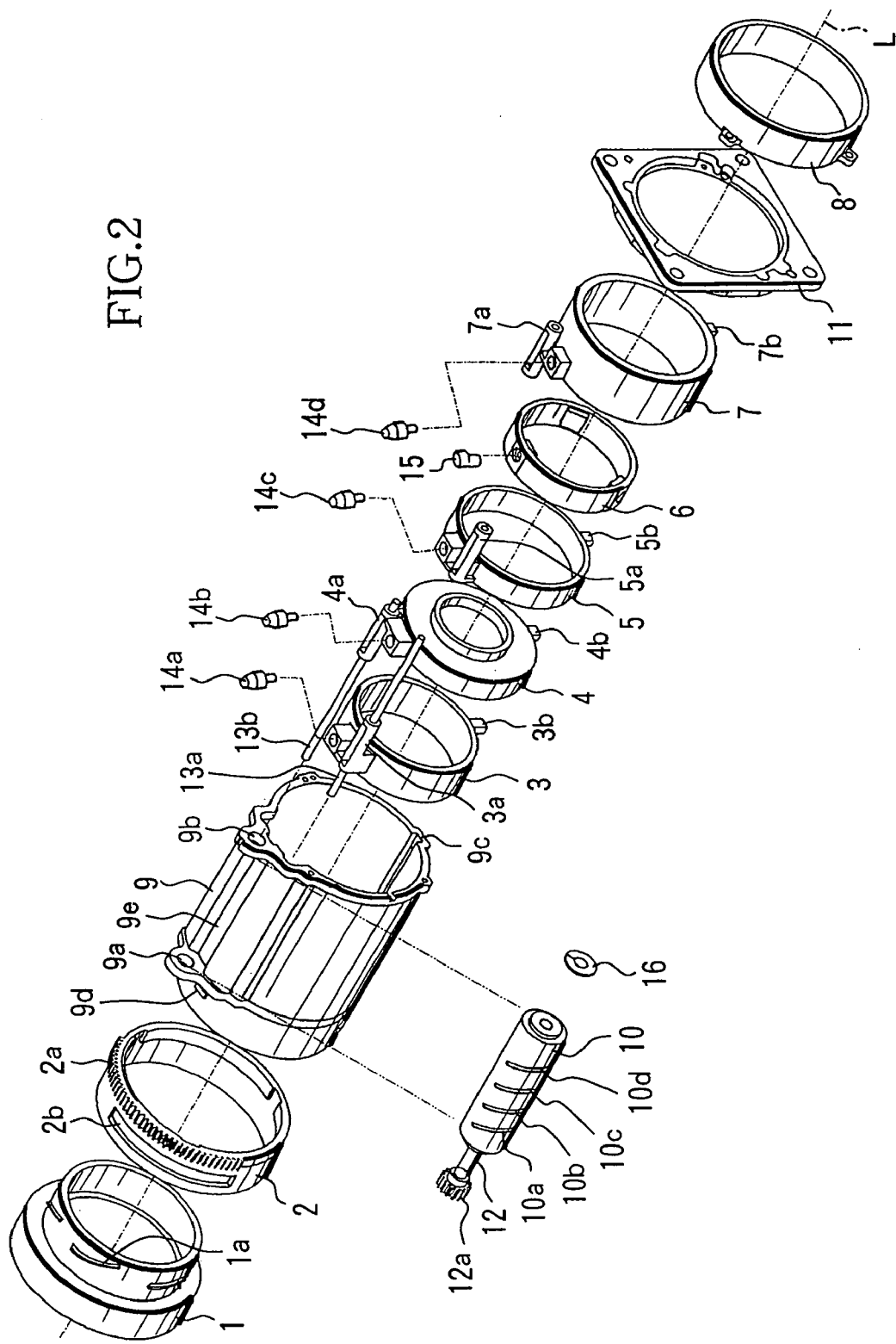
FIG. 2 is an exploded perspective view of the lens barrel shown in FIG. 1.

FIGS. 1 and 2 show the structure of a projection lens barrel (optical apparatus or projection type optical apparatus) which is an embodiment of the present invention.

In these figures, reference numeral 9 denotes a fixed barrel (lens barrel body), and first to fifth holding barrels 1, 3 to 5, 7, holding first to fifth lenses I to V are contained inside it.

While the first lens holding barrel 1 holds the first lens I for focusing, it has a focal operation ring section, and a male helicoid section 1a is formed in the rear section of its circumference. This male helicoid section 1a engages with a female helicoid section 9g formed in the front section of inner circumference of the fixed barrel 9.

Reference numeral 2 is a zoom ring rotatably arranged in the front section of outer circumference of the fixed barrel 9, and a gear section 2a is formed in the rear section of its outer circumference. In addition, pass-through slot sections 2b shown in FIG. 2, which have predetermined length are formed in the circumferential direction are formed in three locations in the circumferential direction of this zoom ring 2, and thrust regulating sections 9d formed in three locations of outer circumference of the fixed barrel 9 are inserted in these pass-through slot sections 2b. When the zoom ring 2 is rotated, further rotation of the zoom ring 2 is prevented since an end face provided in the inner circumference of the zoom ring 2 contacts to a stopper 17 shown in FIG. 1.

The second lens holding barrel 3 holds the second lens II, and constitutes a lens unit. A cam follower 14a is mounted in a location in the circumferential direction of this second lens holding barrel 3, and a sleeve section 3a is formed in a location near to this cam follower 14a in one direction of the circumferential direction. Furthermore, a guide projection 3b is formed in an opposite location of the cam follower 14a with sandwiching a lens's optical axis L in the second lens holding barrel 3.

The third lens holding barrel 4 holds the third lens III, and constitutes a lens unit. A cam follower 14b is mounted in a location in the circumferential direction of the third lens holding barrel 4, and a sleeve section 4a is formed in a location near to the cam follower 14b in the other direction (the opposite side of the sleeve section 3a in the second lens holding barrel 3) of the circumferential direction. Furthermore, a guide projection 4b is formed in an opposite location of the cam follower 14b with sandwiching the lens's optical axis L in the third lens holding barrel 4.

The fourth lens holding barrel 5 holds the fourth lens holding frame 6 (holding the fourth lens IV) described later, and constitutes a lens unit. A cam follower 14c is mounted in a location in the circumferential direction of this fourth lens holding barrel 5, and a sleeve section 5a is formed in a location near to the cam follower 14c in one direction (the same side of the sleeve section 3a) of the circumferential direction. Furthermore, a guide projection 5b is formed in an opposite location of the cam follower 14c with sandwiching the lens's optical axis L in the fourth lens holding barrel 5.

The fourth lens holding frame 6 is arranged in the inner circumference of the fourth lens holding barrel 5, and is combined with the fourth lens holding barrel 5 in three locations through the cam follower 15. Eccentric cam followers are used in two out of three cam followers 15 for optical axis adjustment of the fourth lens IV held by the fourth lens holding frame 6. Since the fourth lens holding frame 6 can rotate to a surface orthogonal to the optical axis L of other lenses by rotating this eccentric cam follower 15, an optical axis of the fourth lens IV can be aligned with the optical axis L of other lenses.

The fifth lens holding barrel 7 holds the fifth lenses V, and constitutes a lens unit. A cam follower 14d is mounted in a location in the circumferential direction of this fifth lens holding barrel 7, and a sleeve section 7a is formed in a location near to the cam follower 14d in the other direction (the same side of the sleeve section 4a of the third lens holding barrel 4) of the circumferential direction. Furthermore, a guide projection 7b is formed in an opposite location of the cam follower 14d with sandwiching the lens's optical axis L in the fifth lens holding barrel 7.

In addition, the second lens II and fourth lens IV are lenses for variable power, and the third lens III and fifth lenses V are correction lenses for correcting the movement of a focal plane at the time of zooming.

Reference numeral 11 denotes a mount plate, and on this mount plate 11, a rear end of the fixed barrel 9, and a front end section of the sixth lens holding barrel 8 holding the sixth lens VI are screwed.

Reference numeral 8 denotes a sixth lens holding barrel holding the sixth lens VI, and is fixed to a rear face of the mount plate 11 with a screw 8a.

Reference numeral 10 denotes a cylindrical cam (cam member) and is a molded part with resin. A shaft section of a gear shaft 12 in which a gear section 12a is provided in its front end is inserted in the inner circumference of the cylindrical cam 10. The gear shaft 12 and cylindrical cam 10 are assembled so that rotation in one piece can be performed in key coupling.

Then, a front section and a rear section of the gear shaft 12 are supported by bearing sections 9a and 9b, formed in front and rear sections which are parts of outer circumference of the fixed barrel 9 in the circumferential direction so that it can be rotated about an axis substantially parallel to the optical axis L. In addition, the gear shaft 12 is prevented from disjoining (moving in the direction of the optical axis L) from the bearing sections 9a and 9b by a stop ring 16.

A gear section 12a of the gear shaft 12 mounted on the fixed barrel 9 in this manner engages with a gear section 2a formed in the zoom ring 2. Therefore, by rotating (manually operating) the zoom ring 2, the rotation is transferred from the gear section 2a to the gear section 12a, the gear shaft 12 rotates, and the cylindrical cam 10 rotates. In addition, it is also good to make such structure that the cylindrical cam 10 is rotated by an electric rotation mechanism rotating the gear section 12a with a motor (not shown).

Four cam groove sections 10a to 10d are formed in the outer circumference of the cylindrical cam 10. The cam followers 14a to 14d of above-described respective lens holing barrels 3, 4, 5, and 7 which penetrate the groove 9e formed in the fixed barrel 9 engage with these cam grooves sections 10a to 10d respectively. As is evident also from FIGS. 1 and 2, respective cam followers 14a to 14d are engaged with cam groove sections 10a to 10d of the cylindrical cam 10 in the state of being arranged in a substantially straight line in the direction of the optical axis L.

Furthermore, it is also good to make such structure that the cam groove sections 10a to 10d formed in the outer periphery of the cylindrical cam 10 are made to be convex cam threads, and the cam followers 14a to 14d of respective lens holding barrels 3, 4, 5, and 7 are engaged with these convex cam threads.

In addition, the sleeve sections 3a and 5a of the second lens holding barrel 3 and fourth lens holding barrel 5 engage with a guide shaft 13a, and the sleeve sections 4a and 7a of the third lens holding barrel 4 and fifth lens holding barrel 7 engage with a guide shaft 13b. These guide shafts 13a and 13b are supported in both sides of them by supporting hole sections 9f and 11a formed in a rear section of the inner circumference of the fixed barrel 9, and a front section of the mount plate 11, and extend in substantially parallel to the optical axis.

Figure 3:
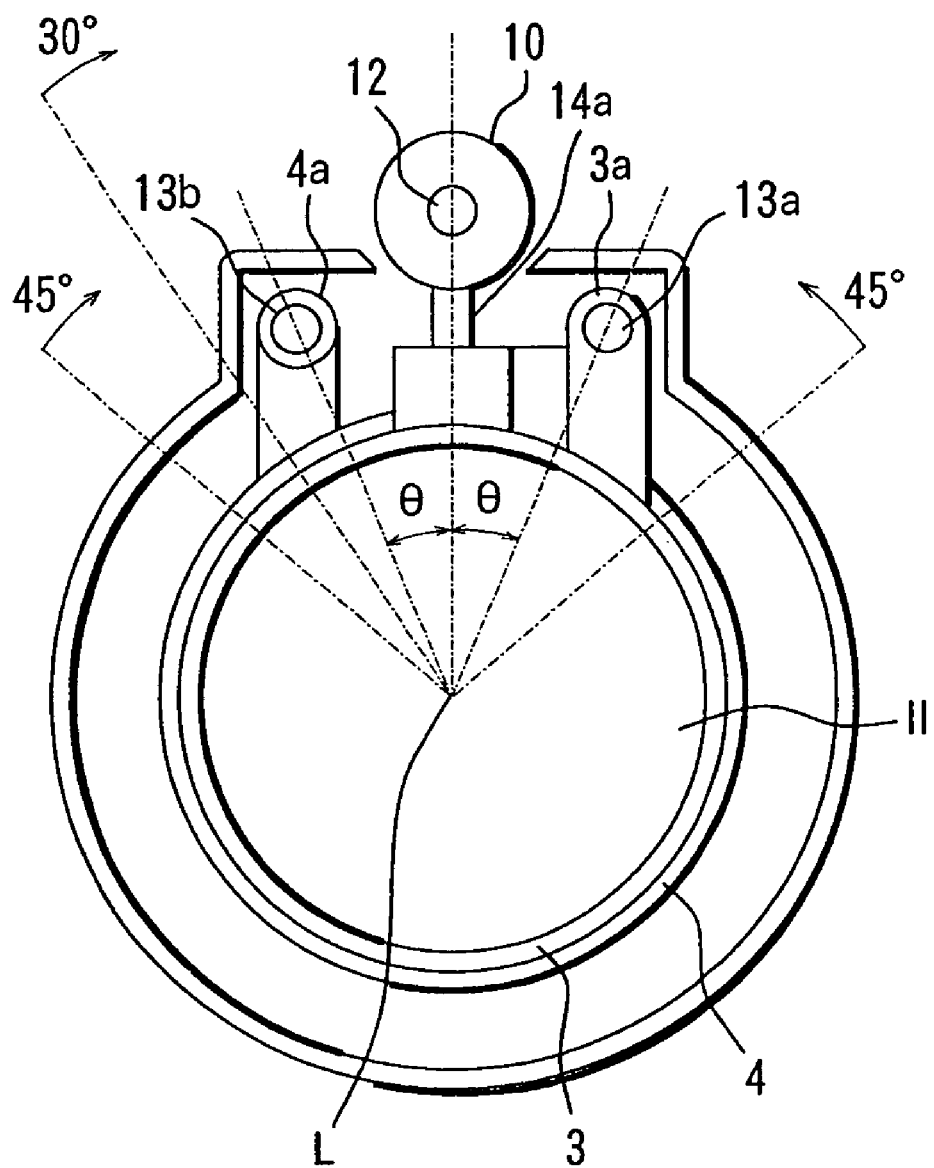
FIG. 3 is a front sectional view of the lens barrel shown in FIG. 1 in view of the direction of an optical axis.

Here, FIG. 3 schematically shows the cross-sectional structure when viewing the above-described lens barrel from the front in the direction of the optical axis. In addition, only the members required for explanation are shown in FIG. 3.

As shown in this figure, in view of the direction of the optical axis, two guide shafts 13a and 13b adjoin nearly to the cylindrical cam 10, namely, are arranged with adjoining nearly in an angle range θ smaller than 30° in the circumferential direction of the lens's optical axis L, respectively.

In addition, in this embodiment, although θ is made to be in a range smaller than 30° to some extent, it is possible to obtain an effect equivalent to the above if they are arranges in an angular range equal to or less than 30°, and furthermore, it is possible to obtain an effect mostly equivalent to the above even if they are arranged in an angular range of about 45°.

The sleeve sections 3a and 5a of the second lens holding barrel 3 and fourth lens holding barrel 5 extend backward from cylindrical body sections of the second lens holding barrel 3 and fourth lens holding barrel 5, respectively. The sleeve sections 4a and 7a of the third lens holding barrel 4 and fifth lens holding barrel 7 extend forward from cylindrical body sections of the third lens holding barrel 4 and fifth lens holding barrel 7, respectively.

Thus, it is possible to secure the sufficient engagement length of these sleeve sections 3a, 4a, 5a, and 7a to the guide shafts 13a and 13b by alternately assigning by turns the sleeve sections 3a, 4a, 5a, and 7a, which engage with two guide shafts 13a and 13b, between the two guide shafts 13a and 13b. For this reason, since it is possible to prevent tilts of the second lens holding barrel 3 to fifth lens holding barrel 6 to the lens's optical axis L, it is possible to obtain the stable optical performance of the lens barrel. Moreover, between the guide shafts 13a and 13b, the cam followers 14a to 14d of respective lens holding barrels 3, 4, 5, and 7 are arranged in a substantially straight line in the direction of the optical axis L, and respective cam followers 14a to 14d are engaged with the cam groove sections 10a to 10d of the cylindrical cam 10. Owing to this, since a point of action, which is an engaging point of the cylindrical cam 10 and cam follower of each lens holding barrel (lens unit), and a guiding point, which is an engaging point of each lens holding barrel (lens unit) and guide shaft, are close, it is possible to stably perform movement in the direction of the optical axis with keeping positional accuracy of each lens holding barrel (lens unit).

In addition, the guide projections 3b to 7b provided in the second lens holding barrel 3 to fifth lens holding barrel 6 engage with the guide groove section 9c formed in the fixed barrel 9. Owing to this, it is possible to prevent each lens holding barrel from rotating about the guide shaft with which each sleeve section engaged.

Furthermore, among respective components described above, the guide shafts 13a and 13b are metal parts, and all the other ones are resin-molded parts.

Here, the assembly procedure of the above-described lens barrel 20 will be described by using FIGS. 1 and 2. First, respective lenses are incorporated into the first lens holding barrel 1, second lens holding barrel 3, third lens holding barrel 4, fourth holding frame 6, fifth lens holding barrel 7, and sixth lens holding barrel 8. Then, the fourth holding frame 6 and fourth lens holding barrel 5 are combined with the cam follower 15. Thereby, each lens unit is completed.

Next, the cam followers 14a to 14d are mounted in the second lens holding barrel 3 to fifth lens holding barrel 7. Then, with incorporating guide shafts 13a and 13b in the fixed barrel 9 and engaging the sleeve sections 3a to 7a of the second lens holding barrel 3 to the fifth lens holding barrel 7 with these guide shafts 13a and 13b, the guide projections 3b to 7b are engaged with the guide groove section 9c of the fixed barrel 9.

Then, after alignment of the mount plate 11 to the fixed barrel 9 with aligning the mount plate 11 with the guide shafts 13a and 13b, they are combined in the fixed barrel 9 with screws (not shown).

Next, the groove section 2b of the zoom ring 2 is fixed to the fixed barrel 9 with aligning the groove section 2b with a thrust regulating section 9d, the first lens holding barrel 1 is combined with the fixed barrel 9 in helicoid coupling, and the stopper screw 18 for focusing is screwed.

Furthermore, with engaging respective cam groove sections 10a to 10d of the cylindrical cam 10 with the cam followers 14a to 14d of respective lens holding barrels 3 to 7, the gear shaft 12 is passed through the bearing sections 9a and 9b of the fixed barrel 9, and the cylindrical cam 10 from the front. At this time, the gear shaft 12 and cylindrical cam 10 are combined in key coupling. Then, the stop ring 16 is mounted in the rear end of the gear shaft 12.

Next, a WIDE end position of zoom is adjusted, the stopper 17 is fixed with a screw 17a, then, with performing the balancing of zoom, flange back adjustment is performed by the optical axis adjustment of the sixth lens holding barrel 8 (sixth lens VI), and the assembly and adjustment of the projector lens barrel 20 is completed.

In the lens barrel 20 constituted as described above, since the cylindrical cam 10 is arranged in a part of outer circumference of the fixed barrel 9, it is possible to lessen the outer diameter of a portion, other than a portion in which the cylindrical cam 10 is arranged, in a lens barrel 20 in comparison with a case of arranging a cam ring over the whole circumference of a lens barrel like a conventional way.

In addition, since the guide shafts 13a and 13b are arranged nearly in contact with the cylindrical cam 10 in the circumferential direction of the lens barrel 20, points of action which are engaging points of cam groove sections 10a to 10d of the cylindrical cam 10 and cam followers 14a to 14d of respective lens holding barrels, and guide points which are engaging points of the sleeve sections 3a to 7a of respective lens holding barrels and guide shafts 13a and 13b become close. Furthermore, since the sleeve sections 3a to 7a of respective lens holding barrels alternately engage with two guide shafts 13a and 13b, it is possible to lengthen the engaging length of each sleeve section to the guide shaft. Hence, since it is easy to obtain the good positional accuracy of each lens holding barrel, it is possible for the lens barrel 20 to be a lens barrel in which tilts of lens units to the optical axis L hardly arise.

Furthermore, since one of the cam followers 14a to 14d which engage with the cylindrical cam 10 is mounted in each of the lens holding barrels 3 to 7 in this embodiment, not only assembly operation is easy, but also it is possible to easily remove a minute tilt even if the minute tilt of respective lens holding barrels 3 to 7 resulting from dispersion in the part accuracy of respective cam followers arises.

Figure 4:
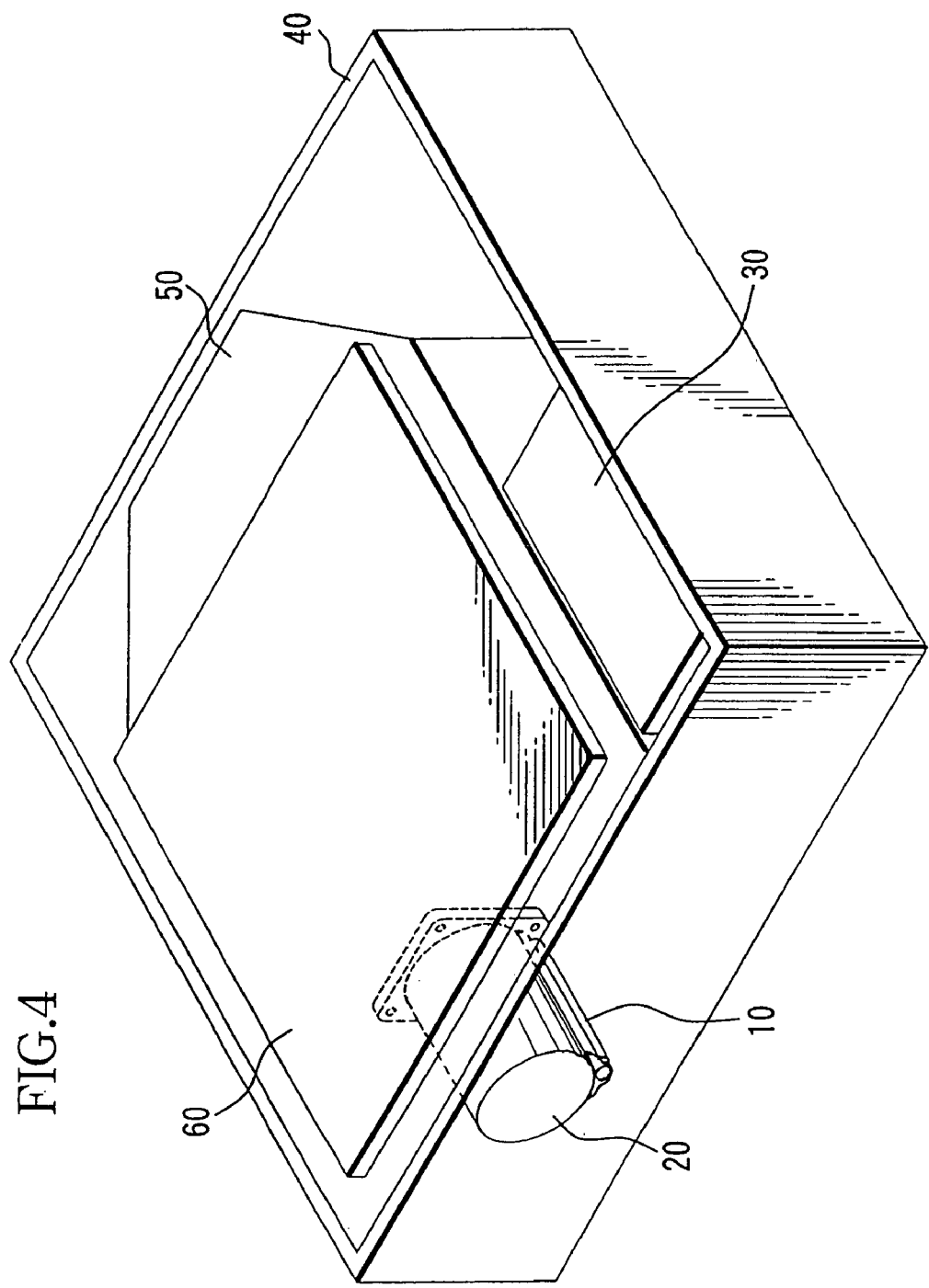
FIG. 4 is a perspective view of a projection type image display apparatus where the lens barrel shown in FIG. 1 is mounted.
Figure 5:
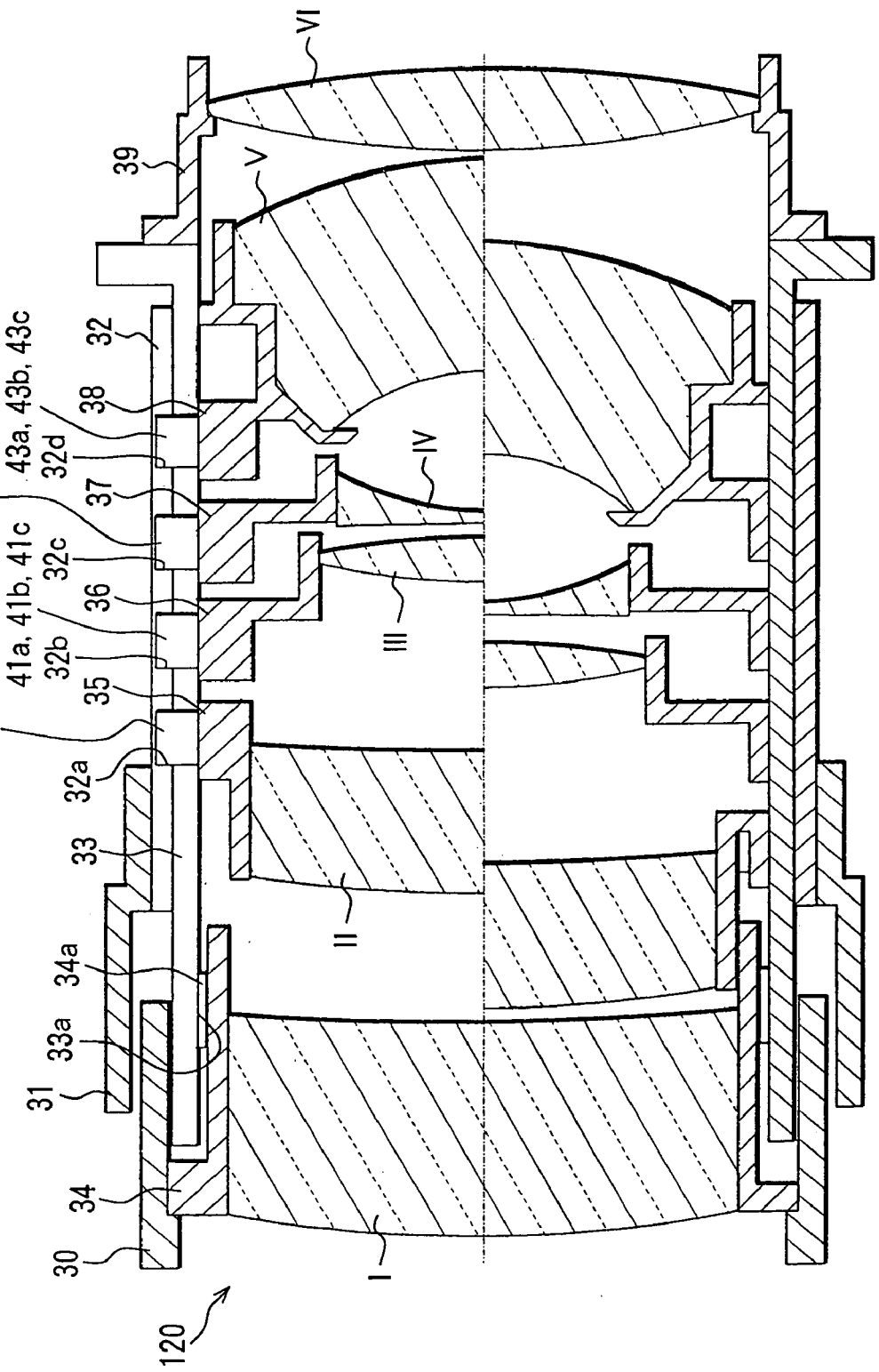
FIG. 5 is a sectional view of a conventional lens barrel.

The projection lens barrel 20 constituted as described above is incorporated in a projection type image display apparatus shown in FIG. 4. In addition, FIG. 4 shows a state where a top cover in an apparatus housing of the projection type image display apparatus is removed.

Inside an apparatus housing 40 of this projection type image display apparatus, an optical box 50 where an illumination optical system, a color separation system, an image forming device, a color synthesis system, etc. which are not shown are incorporated, the above-described projection lens barrel 20 which is mounted in a light emitting section of this optical box 50, a power supply unit 30 used as a power supply for this apparatus, and an electric circuit board 60 which controls the image forming device, illumination lamp, etc. are contained.

The electric circuit board 60 is arranged above the optical box 50 and projection lens barrel 20 closely.

Here, when mounting the mount plate 11 of the projection lens barrel 20 on the light emitting section of the optical box 50, the projection lens barrel 20 is mounted in such a direction that the cylindrical cam 10 and guide shafts 13a and 13b are located downward, that is, in the opposite side of the electric circuit board 60 with sandwiching a lens's optical axis.

Thereby, the guide shafts 13a and 13b which are metal parts can be arranged with being apart from the electric circuit board 60.

Therefore, in addition to the cylindrical cam 10 formed with resin, it is possible to certainly avoid that a metal part of the lens barrel 20 becomes a noise-generating factor in the electric circuit board 60 by receiving noise from the power supply unit 30.

In addition, although a lens barrel mounted in a projection type image display apparatus is described in this embodiment, the lens barrel of the present invention can be also mounted in other optical instruments such as an image-taking apparatus.

While preferred embodiments have been described, it is to be understood that modification and variation of the present invention may be made without departing from the sprit or scope of the following claims.

What is claimed is:

1. A projection optical system for a projector, which projects an image formed by an image forming device, comprising:
   a lens barrel body containing inside a plurality of lens units which can move in the direction of an optical axis, each of said lens units has a cam follower, and
   a cam member which has cams engaging with the cam followers of said lens units and drives said lens units in the direction of the optical axis by rotating,
   wherein said cam member is a cylindrical cam and rotates about an axis substantially parallel to the optical axis, and said cam member is arranged in apart of the outer circumference of the lens barrel body.

2. The projection optical system according to claim 1, wherein said cam followers of said lens units are disposed substantially straight in the direction of the optical axis.

3. The projection optical system according to claim 2, further comprising:
   sleeves which are provided in each of said lens units, two guide shafts which guide said lens units in the direction of the optical axis, and
   a guide portion which guides said plurality of lens units in the direction of the optical axis,
   wherein said sleeves of said lens units engage with said two guide shafts alternately in the direction of the optical axis.

4. The projection optical system according to claim 3, wherein said cam followers of said lens units are arranged between said two guide shafts and disposed substantially straight in the direction of the optical axis.

5. A projector comprising:
a projection optical system according to claim 4;
an image forming device which forms an original image, and
an electric circuit board which is arranged substantially parallel to the optical axis of said projection optical system,
wherein said projection optical system projects light, modulated by said image forming device, on a projection surface, and said projection optical system is arranged so that said cam member and said two guide shafts are located in an opposite side of said electric circuit board with sandwiching the optical axis.

6. A projector comprising:
a projection optical system according to claim 3;
an image forming device which forms an original image, and
an electric circuit board which is arranged substantially parallel to the optical axis of said projection optical system,
wherein said projection optical system projects light, modulated by said image forming device, on a projection surface, and said projection optical system is arranged so that said cam member and said two guide shafts are located in an opposite side of said electric circuit board with sandwiching the optical axis.

7. The projection optical system according to claim 1, wherein said cylindrical cam is made of resin.

8. A projector comprising:
a projection optical system according to claim 1; and
an image forming device which forms an original image,
wherein said projection optical system projects light, modulated by said image forming device, on a projection surface.

9. A projector comprising:
a projection optical system according to claim 1;
an image forming device which forms an original image; and
an electric circuit board which is arranged substantially parallel to the optical axis of said projection optical system,
wherein said projection optical system projects light, modulated by said image forming device, on a projection surface, and said projection optical system is arranged so that said cain member and said two guide shafts are located in an opposite side of said electric circuit board with sandwiching the optical axis.

10. A projector comprising:
an optical apparatus having a lens barrel body containing inside at least three lens units which can move in the direction of an optical axis and a cylindrical cam member arranged in a part of the outer circumference of the lens barrel body each of said at least three lens units having a sleeve, two guide shafts which guide said lens units in the direction of the optical axis, and a guide portion which guides said at least three lens units in the direction of the optical axis, wherein the sleeves of said at least three lens units engage with said two guide shafts alternately in the direction of the optical axis;
an image forming device which forms an original image; and
an electric circuit board which is arranged substantially parallel to the optical axis of said optical apparatus,
wherein said optical apparatus projects light, modulated by said image forming device, on a projection surface, and
said optical apparatus is arranged so that said cylindrical cam member and said two guide shafts are located in an opposite side of said electric circuit board with sandwiching the optical axis.

11. A projector comprising:
an optical apparatus having a lens barrel body containing inside at least three lens units which can move in the direction of an optical axis, each of said at least three lens units having a cam follower and a sleeve, two guide shafts which guide said at least three lens units in the direction of the optical axis, a guide portion which guides said at least three lens units in the direction of the optical axis, and a cam member which has cams engaging with the cam followers of said at least three lens units and drives said at least three lens units in the direction of the optical axis by rotating, wherein said cam member, arranged in a part of the outer circumference of the lens barrel body, is cylindrical cam and rotates about an axis substantially parallel to the optical axis, wherein the sleeves of said at least three lens units engage with said two guide shafts alternately in the direction of the optical axis, wherein said cam followers of said at least three lens units are arranged between said two guide shafts and disposed substantially straight in the direction of the optical axis;
an image forming device which forms an original image; and
an electric circuit board which is arranged substantially parallel to the optical axis of said optical apparatus,
wherein said optical apparatus projects light, modulated by said image forming device, on a projection surface, and
wherein said optical apparatus is arranged so that said cam member and said two guide shafts are located in an opposite side of said electric circuit board with sandwiching the optical axis.

12. A projection optical system for a projector, which projects an image formed by an image forming device, comprising:
a plurality of lens units, which can move in the direction of an optical axis, each of said lens units has a cam follower;
a lens barrel body containing inside the lens units: and
a cam member, which has cams engaging with said cam followers of said lens units and drives said lens units in the direction of the optical axis by rotating,
wherein said cam member is a cylindrical cam and is arranged in a part of the outer circumference of the lens barrel body rotating about an axis substantially parallel to the optical axis.

13. The projection optical system according to claim 12, wherein said cam followers of said lens units are disposed substantially straight in the direction of the optical axis.

14. The projection optical system according to claim 13, further comprising:
sleeves, which are provided in each of said lens units, two guide shafts, which guide said lens units in the direction of the optical axis, and a guide portion, which guides said plurality of lens units in the direction of the optical axis,
wherein said sleeves of said lens units engage with said two guide shafts alternately in the direction of the optical axis.

15. The projection optical system according to claim 14, wherein said cam followers of said lens units are arranged between said two guide shafts and disposed substantially straight in the direction of the optical axis.

16. The projection optical system according to claim 12, wherein said cylindrical cam is made of resin.

17. A projector comprising:
a projection optical system according to claim 12; and
an image forming device, which forms an original image,
wherein said projection optical system projects light, modulated by said image forming device, on a projection surface.

18. A projector comprising:
a projection optical system according to claim 12;
an image forming device, which forms an original image, and
an electric circuit board, which is arrange substantially parallel to the optical axis of said projection optical system,
wherein said projection optical system projects light, modulated by said image forming device, on a projection surface, and said projection optical system is arranged so that said cam member and said two guide shafts are located in an opposite side of said electric circuit board with sandwiching the optical axis.

* * * * *

UNITED STATES PATENT AND TRADEMARK OFFICE
CERTIFICATE OF CORRECTION

PATENT NO. : 7,072,122 B2 Page 1 of 1
APPLICATION NO. : 11/233768
DATED : July 4, 2006
INVENTOR(S) : Suzuki It is certified that error appears in the above-identified patent and that said Letters Patent is hereby corrected as shown below:

In the Claim:

In claim 1 (col. 8, line 53), please replace "apart" with --a part--.

In claim 9 (col. 9, line 50), please replace "cain" with --cam--.

Signed and Sealed this

Sixth Day of March, 2007

JON W. DUDAS
*Director of the United States Patent and Trademark Office*